(12) United States Patent
Lacroix

(10) Patent No.: US 10,323,826 B2
(45) Date of Patent: Jun. 18, 2019

(54) OPTICAL SYSTEM, METHOD, AND APPLICATIONS

(71) Applicant: SIGNIFY HOLDING B.V., Eindhoven (NL)

(72) Inventor: Luc Guy Louis Lacroix, Groton, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/769,577

(22) PCT Filed: Oct. 18, 2016

(86) PCT No.: PCT/EP2016/074954
§ 371 (c)(1),
(2) Date: Apr. 19, 2018

(87) PCT Pub. No.: WO2017/067915
PCT Pub. Date: Apr. 27, 2017

(65) Prior Publication Data
US 2018/0313519 A1 Nov. 1, 2018

Related U.S. Application Data

(60) Provisional application No. 62/243,806, filed on Oct. 20, 2015.

(51) Int. Cl.
*F21V 5/00* (2018.01)
*F21V 5/04* (2006.01)
(Continued)

(52) U.S. Cl.
CPC .............. *F21V 7/0091* (2013.01); *F21V 5/04* (2013.01); *F21V 7/0066* (2013.01);
(Continued)

(58) Field of Classification Search
CPC .... F21V 7/0091; F21V 7/0066; F21V 7/0083; F21V 7/07; F21Y 2113/17; F21Y 2115/10
See application file for complete search history.

(56) References Cited

U.S. PATENT DOCUMENTS 9,347,642 B2 * 5/2016 Catalano ................... F21V 5/04
2010/0096993 A1 * 4/2010 Ashdown .............. F21V 29/004
315/113
(Continued)

FOREIGN PATENT DOCUMENTS

CN 202902148 U 4/2014
EP 2803898 A1 11/2014
(Continued)

*Primary Examiner* — Mary Ellen Bowman

(57) ABSTRACT

An optical system (200, 300, 400), including: at least one 2×2 LED array forming a node (204) consisting of four different color LEDs: $LED_1(G)$, $LED_2(R)$, $LED_3$ (B), $LED_4$ (W) and at least one respective TIR light-directing housing forming an optic (202) having a base end (208) and a light-emitting end (210), in which the node is disposed in the base end. The optic is characterized by a shape having four different focal points (F1, F2, F3, F4), and each of the $LED_1$, $LED_2$, $LED_3$, $LED_4$ is disposed at a respective one of the focal points.

15 Claims, 15 Drawing Sheets

(51) Int. Cl.
  *F21V 7/00*     (2006.01)
  *F21V 7/07*     (2006.01)
  *G02B 19/00*    (2006.01)
  *F21Y 113/13*   (2016.01)
  *F21Y 113/17*   (2016.01)
  *F21Y 115/10*   (2016.01)

(52) U.S. Cl.
  CPC .............. *F21V 7/0083* (2013.01); *F21V 7/07* (2013.01); *G02B 19/0028* (2013.01); *G02B 19/0066* (2013.01); *F21V 5/007* (2013.01); *F21Y 2113/13* (2016.08); *F21Y 2113/17* (2016.08); *F21Y 2115/10* (2016.08)

(56) References Cited

U.S. PATENT DOCUMENTS

2014/0268732 A1* 9/2014 Randolph ................. F21V 5/04
  362/231
2015/0009677 A1* 1/2015 Catalano ............ H05B 33/0845
  362/296.07

FOREIGN PATENT DOCUMENTS

| WO | 2004097516 A2 | 11/2004 | |
|---|---|---|---|
| WO | 2008066785 A2 | 6/2008 | |
| WO | WO-2008066785 A2 * | 6/2008 | ............ F21V 7/0091 |
| WO | 2014016227 A1 | 1/2014 | |
| WO | WO-2014016227 A1 * | 1/2014 | ......... G02B 19/0066 |

* cited by examiner

OPTICAL SYSTEM, METHOD, AND APPLICATIONS

CROSS-REFERENCE TO PRIOR APPLICATIONS

This application is the U.S. National Phase application under 35 U.S.C. § 371 of International Application No. PCT/EP2016/074954, filed on Oct. 18, 2018 which claims the benefit of Provisional Patent Application No. 62/243,806, filed on Oct. 20, 2015. These applications are hereby incorporated by reference herein.

FIELD OF THE INVENTION

The present disclosure is directed generally to an optical system, and more particularly, to an optical system including an array of different colored LEDs, each of which being disposed at a separate focal point within an optic formed of a total internal reflection ("TIR") light-directing housing with a TIR profile and to a grouping of a certain number of such optics together in a particular manner.

BACKGROUND

Optical systems including a single LED disposed within an optic with a TIR profile are known. The single LED is positioned at the base of the optic so that the central axis of the optic extends through the center of the single LED, which is known as the single focal point of the optic with a coordinate of 0, 0, 0 in the x, y, and z planes, respectively. A related problem with such conventional optical systems is that they do not deliver a very uniform beam of light. Further, when such conventional optical systems are packed together in a cluster or otherwise associated with other such optical systems, color mixing can be very poor.

Accordingly, there is a need in the art for an optical system that can provide a tighter, brighter, and more uniform beam of light, and that can permit better color mixing as compared to the conventional optical systems.

SUMMARY OF THE INVENTION

The present disclosure is directed to an inventive arrangement, structure, and resulting function of an array of different colored LEDs, each of which being disposed at a separate focal point within a particularly shaped optic. Various embodiments and implementations herein are directed to an optical system including at least one 2×2 LED array forming a node consisting of four different color LEDs, and at least one respective TIR light-directing housing forming an optic having a base end and a light-emitting end, in which the node is disposed in the base end. The optic is characterized by a TIR profile having four different focal points, where each of the four different color LEDs is positioned at a respective one of the focal points. Further embodiments can include a plurality of nodes within a plurality of respective optics positioned adjacent to one another. In particular, these embodiments can include a plurality of N nodes and N respective optics, where N is an integer multiple of 4, where each node disposed in its respective optic is rotated by 90 degrees with respect to an immediately adjacent node in its respective optic. This plurality of N nodes and N respective optics can be adjacently disposed/positioned in any geometrically shaped configuration or array including a circular configuration, a diamond shaped configuration, or linearly positioned adjacent to one another in a 1×N array. Additionally, this plurality of N nodes and N respective optics can be adjacently disposed/positioned in an array where the array is one of an m-by-n array where m and n are integers and m may be equal or not equal to n.

Using the various embodiments and implementations herein, the tightness, brightness, and uniformity of the beam of light, and color mixing at the far field (as should be appreciated by one of skill in the art) delivered by the optical system can be substantially improved as compared with the conventional optical systems. For example, a 90%+efficiency (2 pi), relatively high punch (center beam), and a tight beam of approximately 5 degrees has been obtained.

The improved optical system disclosed and described herein can be used in conjunction with any lighting device, fixture or system. One example of a lighting system that the improved optical system can be used with is the series of icolor flood lighting systems available from Koninklijke Philips Electronics N.V.

Generally in one aspect, an optical system is provided and includes, but is not limited to, at least one 2×2 LED array forming a node consisting of four different color LEDs: $LED_1$, $LED_2$, $LED_3$, $LED_4$ and at least one respective TIR light-directing housing forming an optic having a base end and a light-emitting end, in which the node is disposed in the base end, where the optic is characterized by a shape having four different focal points, and where each of the $LED_1$, $LED_2$, $LED_3$, $LED_4$ is disposed at a respective one of the focal points.

In accordance with an embodiment, wherein $LED_1$ is a green-emitting LED, $LED_2$ is red-emitting LED, $LED_3$ is a blue-emitting LED, and $LED_4$ is a mint white-emitting LED.

In accordance with an embodiment, the optic has a TIR profile.

In accordance with an embodiment, the optic consists of four optical quadrant sections, wherein each of the four optical quadrant sections is characterized by one of the four focal points.

In accordance with an embodiment, further including a plurality of N nodes and N respective optics, where N is an integer multiple of 4, further wherein each node disposed in its respective optic is rotated by 90 degrees with respect to an immediately adjacent node in its respective optic.

In accordance with an embodiment, the N nodes and the N respective optics are adjacently disposed in an array, wherein the array is one of an m-by-n array where m and n are integers and m may be equal or not equal to n, and a 1×N array.

In accordance with an embodiment, the optic is an injected-molded component.

In accordance with an embodiment, the optic is transparent over the visible spectrum.

In accordance with an embodiment, the optic is transparent over the visible spectrum.

In accordance with an embodiment, each of the $LED_1$, $LED_2$, $LED_3$, $LED_4$ has a variable intensity.

In accordance with an embodiment, the optic has a textured interior surface.

Generally in one aspect, a method of emitting light in a specified beam pattern is provided and includes, but is not limited to, the steps of: providing an optical system including: at least one 2×2 LED array forming a node consisting of four different color LEDs: $LED_1$, $LED_2$, $LED_3$, $LED_4$; and at least one respective TIR light-directing housing forming an optic having a base end and a light-emitting end, in which the node is disposed in the base end, where the optic is characterized by a shape having four different focal points, and wherein each of the LED1, LED2, LED3, LED4 is disposed at a respective one of the focal points; energizing the at least one node; and illuminating a space adjacent the light-emitting end of the optic.

In accordance with an embodiment, further including the step of adjusting at least one of an intensity and a color of at least one of the LEDs to provide a desired color output from the optical system.

In accordance with an embodiment, further including the step of adjusting the TIR profile of the optic to provide the specified emitted beam pattern.

In accordance with an embodiment, further including the step of providing a plurality of N nodes and N respective optics, where N is an integer multiple of 4, further wherein each node disposed in its respective optic is rotated by 90 degrees with respect to an immediately adjacent node in its respective optic.

In accordance with an embodiment, further including the step of adjacently disposing the N nodes and the N respective optics in an array, wherein the array is one of an m-by-n array where m and n are integers and m may be equal or not equal to n, and a 1×N array.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of an improved optical system. More generally, Applicant has recognized and appreciated that it would be beneficial to provide an optical system that includes an array of different colored LEDs, each of which being disposed at a separate focal point within an optic formed of a TIR light-directing housing, and grouping a certain number of such optics together in a particular manner for the purposes of providing a tighter, brighter and more uniform beam of light and better color mixing in the far field as compared to the conventional optical systems.

In one arrangement, a substantially improved, tighter, brighter and more uniform beam of light can be obtained by providing the array of different colored LEDs, each of which being disposed at a separate focal point within an optic formed of a TIR light-directing housing, as opposed to the conventional optical systems which utilize a single LED disposed within an optic. In another arrangement, substantially improved color mixing in the far field can be obtained by providing a grouping of a certain number of such optics together in a particular manner.

In view of the foregoing, various embodiments and implementations are directed to an optical system including at least one 2×2 LED array forming a node consisting of four different color LEDs, and at least one respective TIR light-directing housing forming an optic having a base end and a light-emitting end, in which the node is disposed in the base end. The optic is characterized by a TIR profile having four different focal points, where each of the four different color LEDs is positioned at a respective one of the focal points. Further embodiments and implementations are directed to a plurality of nodes within a plurality of respective optics positioned adjacent to one another. These embodiments can include a plurality of N nodes and N respective optics, where N is an integer multiple of 4, where each node disposed in its respective optic is rotated by 90 degrees with respect to an immediately adjacent node in its respective optic. This plurality of N nodes and N respective optics can be adjacently disposed/positioned in any geometrically shaped configuration or array including a circular configuration, a diamond shaped configuration, or linearly positioned adjacent to one another in a 1×N array. Additionally, this plurality of N nodes and N respective optics can be adjacently disposed/positioned in an array where the array is one of an m-by-n array where m and n are integers and m may be equal or not equal to n.

Figure 1A:
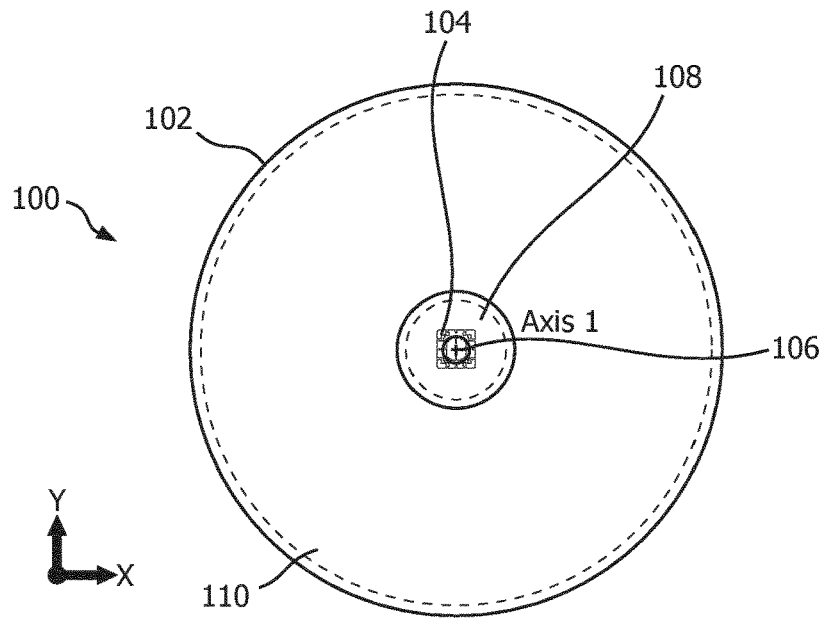
FIG. 1A is a front view transparent schematic representation of a prior art optical system.
Figure 1B:
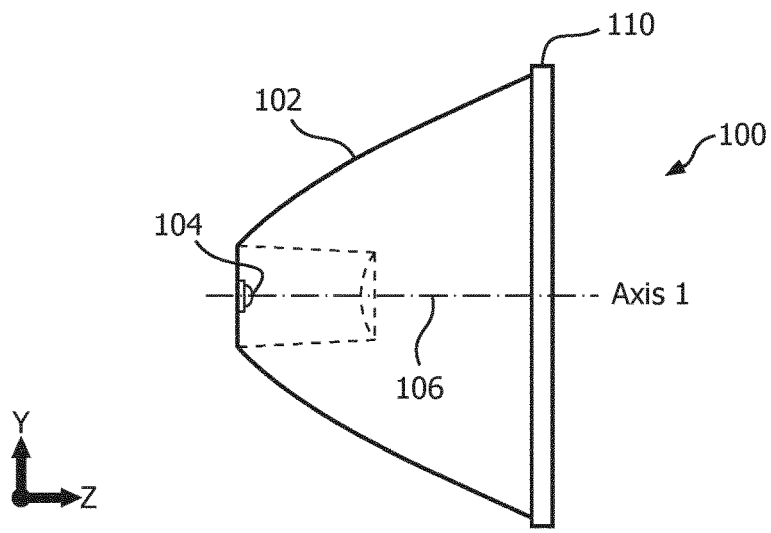
FIG. 1B is a side view transparent schematic representation of the prior art optical system shown in FIG. 1A.
Figure 1C:
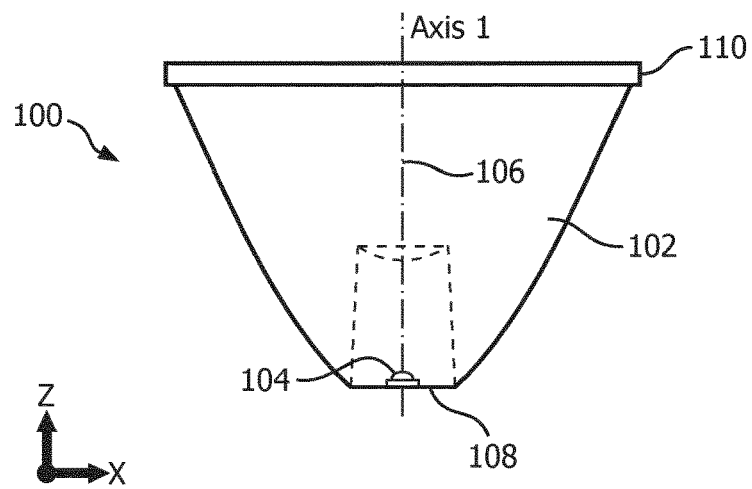
FIG. 1C is another side view transparent schematic representation of the prior art optical system shown in FIG. 1A.
Figure 1D:
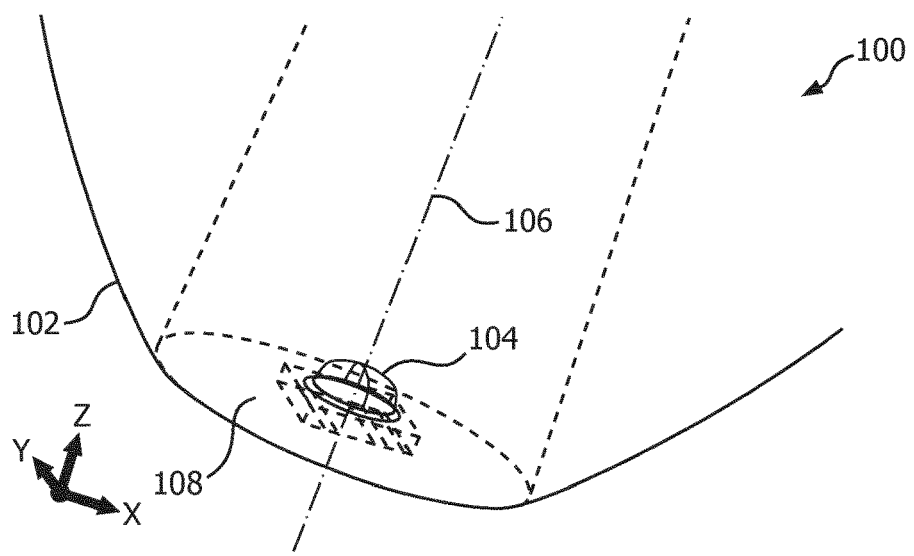
FIG. 1D is a magnified perspective view transparent schematic representation of the base portion of the prior art optical system shown in FIG. 1A.

Referring to FIGS. 1A-1D, various full transparent schematic representations of an example of a prior art optical system 100 are shown. More specifically, FIG. 1A is a front (light emitting end 110) view schematic representation of optical system 100, FIG. 1B is a side view schematic representation of optical system 100, FIG. 1C is another side view schematic representation of optical system 100, and FIG. 1D is a magnified perspective view schematic representation of the base portion 108 of optical system 100. As shown in FIGS. 1A-1D, the prior art optical system 100 includes an optic 102 having a light emitting end 110 and a base portion 108. A single LED 104 is positioned in the center and at the focal point of the base portion 108, and a central optical axis ("Axis1") 106 is positioned through center of the optic 102 and of the center of the LED 104 at coordinates 0, 0, 0 (in the x, y, and z planes respectively).

Figure 2A:
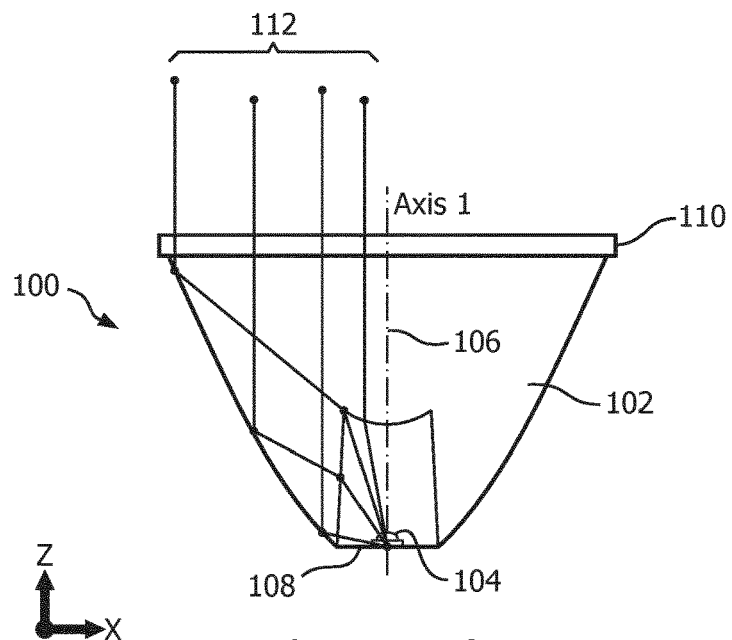
FIG. 2A is a cross sectional side view schematic representation of the prior art optical system shown in FIG. 1A.
Figure 2B:
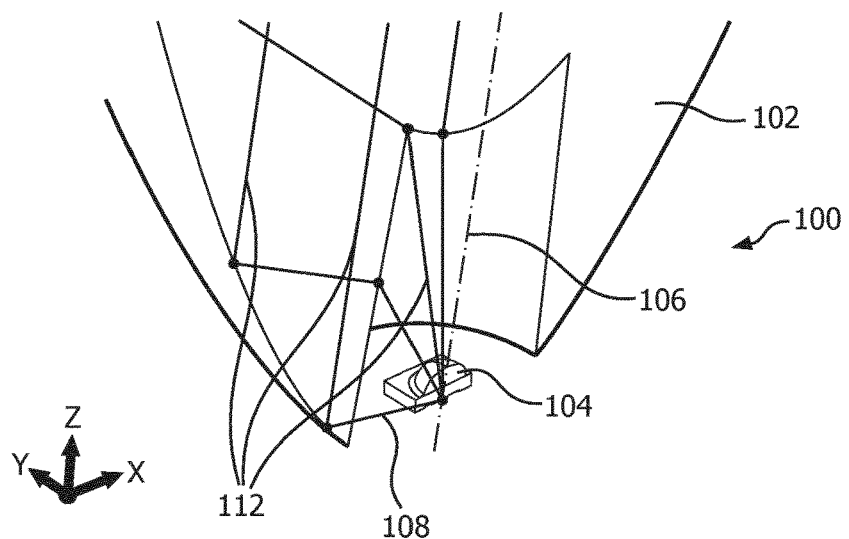
FIG. 2B is a magnified perspective cross sectional view schematic representation of the base portion of the prior art optical system shown in FIG. 1A.

Referring to FIGS. 2A-2B, cross sectional schematic representations of the prior art optical system 100 (shown in FIGS. 1A-1D) are shown. More specifically, FIG. 2A is a cross sectional side view schematic representation of the optical system 100 shown in FIG. 1C, and FIG. 2B is a magnified perspective cross sectional view schematic representation of the base portion 108 of optical system 100. Similar to FIGS. 1A-1D, FIGS. 2A and 2B show the optic 102 having a light emitting end 110 and a base portion 108, the single LED 104 positioned in the center and focal point of the base portion 108, and the central axis 106 positioned through center of the optic 102 and through the center of the LED 104. The lines marked with reference numeral 112 represent the light path from the single LED 104 through the light emitting end 110 of the optic. As shown, the geometry of the optic 102, the geometry of the single LED 104, and the placement of the LED 104 within the optic, allows for total internal reflection of light emitted from the LED 104, which is redirected through the light emitting end 110 parallel to the central axis 106.

Figure 3A:
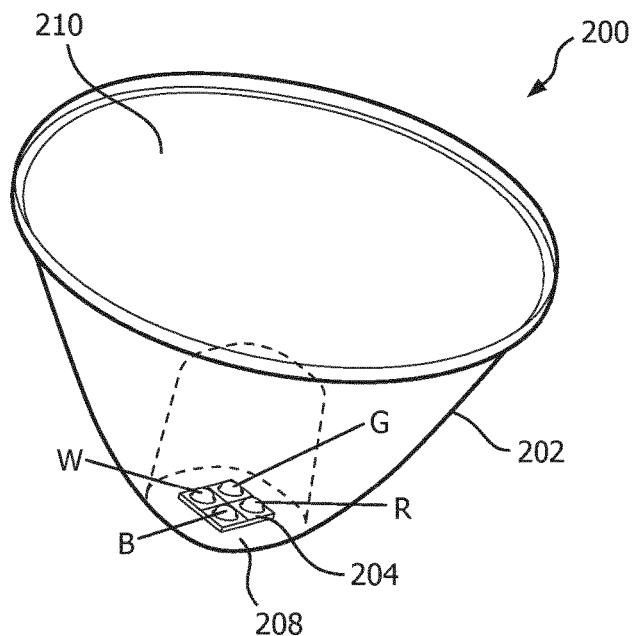
FIG. 3A is perspective view schematic representation of an optical system in accordance with an embodiment.
Figure 3B:
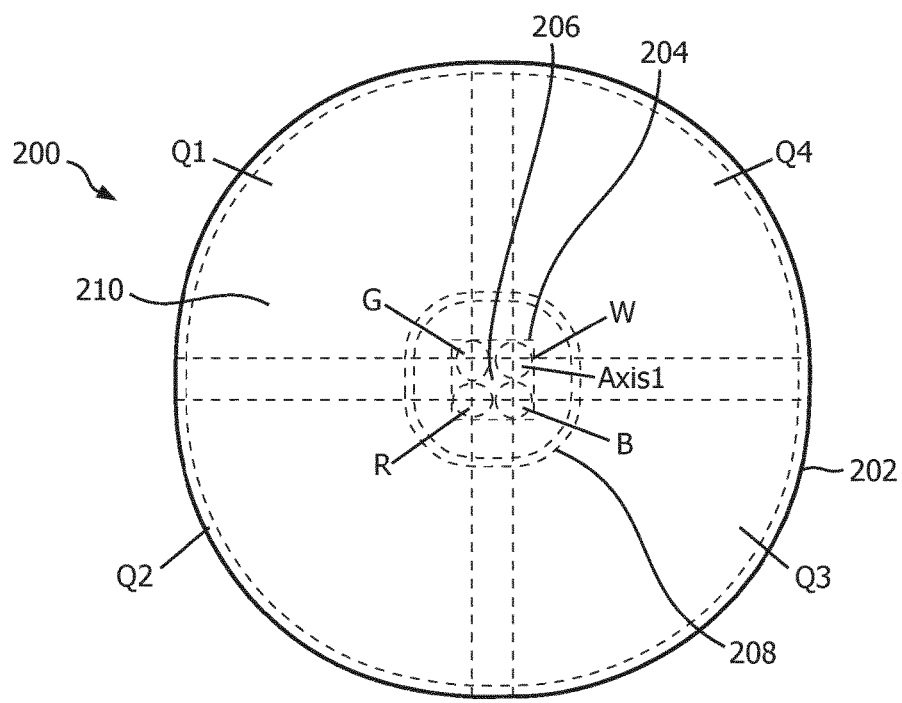
FIG. 3B is a front view schematic transparent representation of the optical system shown in FIG. 3A in accordance with an embodiment.

In embodiments of the present invention, schematic representations of optical system 200 are shown in FIGS. 3A and 3B. More specifically, FIG. 3A is a perspective view schematic representation of optical system 200 including an optic 202 with a TIR profile and a portion cut away to show a 2×2 LED array or cluster of LEDs forming a node 204 disposed in a base portion 208 of the optic 202. As is well known by one of skill in the art, "TIR profile" means that the fully formed optic 202 can have any geometry that provides for total internal reflection of light emitted from the 2×2 LED array. Stated differently, the optic 202 can be advantageously designed to embody a particular geometric profile such that light emitted from the 2×2 LED array strikes any part of the internal portion of the optic 202 at an angle larger than the critical angle with respect to the normal of the surface, and is directed out of the light emitting end 210 of the optic 202 in a direction substantially parallel to the central optical axis 206. Further, the refractive index is lower on the outside of the optic 202 (which is presumably air with a refractive index of approx. 1.0) as compared with optic 202, where optic 202 is advantageously made from optical grade plastic polymer (e.g., PMMA, having a refractive index of approx. 1.5) or polycarbonate (refractive index of approx. 1.6)) to limit impurities (as similarly described below with respect to Q1). The particular geometric shape of the optic 202 shown in FIGS. 3A and 3B, for example, may be hyperbolic. However, the geometric shape (or profile) of the optic 202 need not be limited to this particular shape as long as the constraints for TIR are met, which will depend on physical parameters of the light source and the optic, illumination angle, and others known in the art.

Node 204 consists of four different colored LEDs—green ("G"), red ("R"), blue ("B") and white or mint white ("W"). A light emitting end 210 of the optic 202 is also shown. FIG. 3B is a front (light emitting end 210) view transparent schematic representation of optical system 200. FIG. 3B shows optic 202 having a light emitting end 110 and a base portion 208 (which is advantageously flat). Node 204, consisting of the four different colored LEDs—green ("G"), red ("R"), blue ("B") and white or mint white ("W")—is also shown disposed in the base portion 208 of the optic 202. Optical system 200 includes a central optical axis ("Axis1") 206 positioned through center of the optic 202 and through the center of the node 204 at coordinates 0, 0, 0 (in the x, y, and z planes respectively). Each of the four LEDS (G, R, B, and W) is positioned at a focal point and is in focus with a particular ¼ of the optic 202 (or quadrant) directly above it. Specifically, green LED G is positioned at a focal point within quadrant no. 1 ("Q1") and is in focus with Q1 and is out of focus with the other three quadrants (Q2, Q3 and Q4). Similarly, red LED R is positioned at a focal point within quadrant no. 2 ("Q2") and is in focus with Q2 and is out of focus with the other three quadrants (Q1, Q3 and Q4), blue LED B is positioned at a focal point within quadrant no. 3

("Q3") and is in focus with Q3 and is out of focus with the other three quadrants (Q1, Q2 and Q4), and white LED W is positioned at a focal point within quadrant no. 4 ("Q4") and is in focus with Q4 and is out of focus with the other three quadrants (Q1, Q2 and Q3). Other embodiments can include different colored LEDs, and/or different positioning of the LEDs within the node 204.

Referring to FIGS. 4A-4B, 5A-5B, 6A-6B, and 7A-7B, in additional embodiments, the creation of the design, structure, and configuration of the optical system 200 is described. More particularly, the creation/formation of the optic 202 with the TIR profile and four quadrants each of which containing a respective focal point, and the positioning of each of the four LEDS (G, R, B, and W) of node 204 on the base portion 208 of the optic 202 at a respective focal point within a particular ¼ of the optic 202 (or quadrant) directly above it, are described with reference to these figures.

Figure 4A:
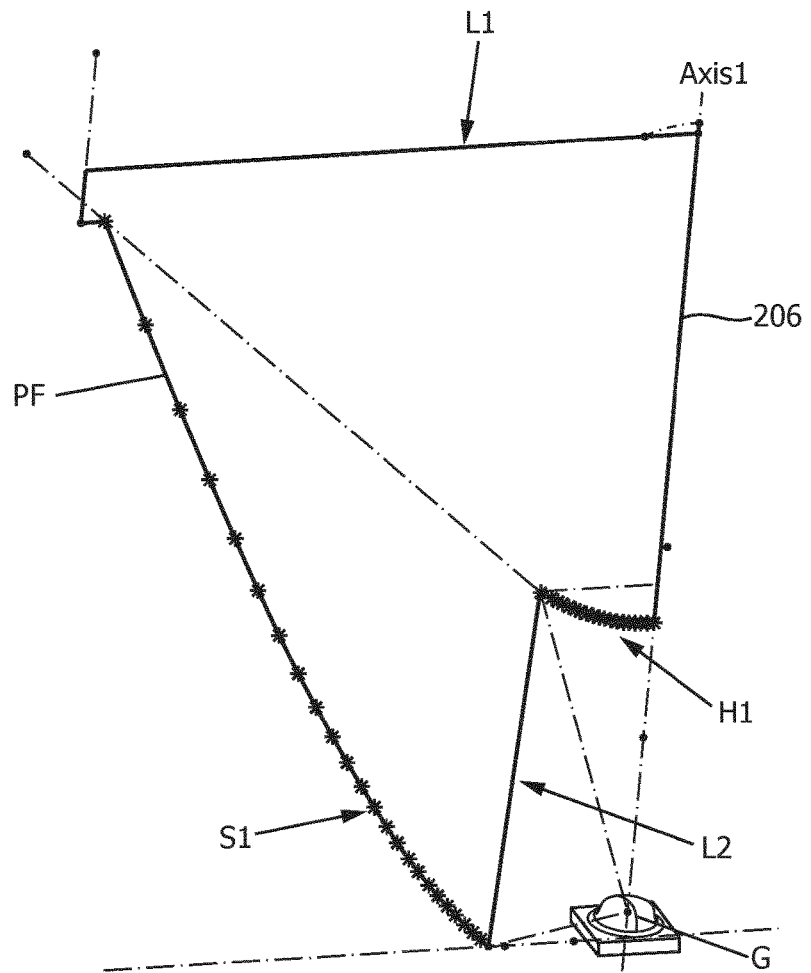
FIG. 4A is a perspective view schematic representation of a profile of quadrant no. 1 ("Q1") of an optical system in accordance with an embodiment.
Figure 4B:
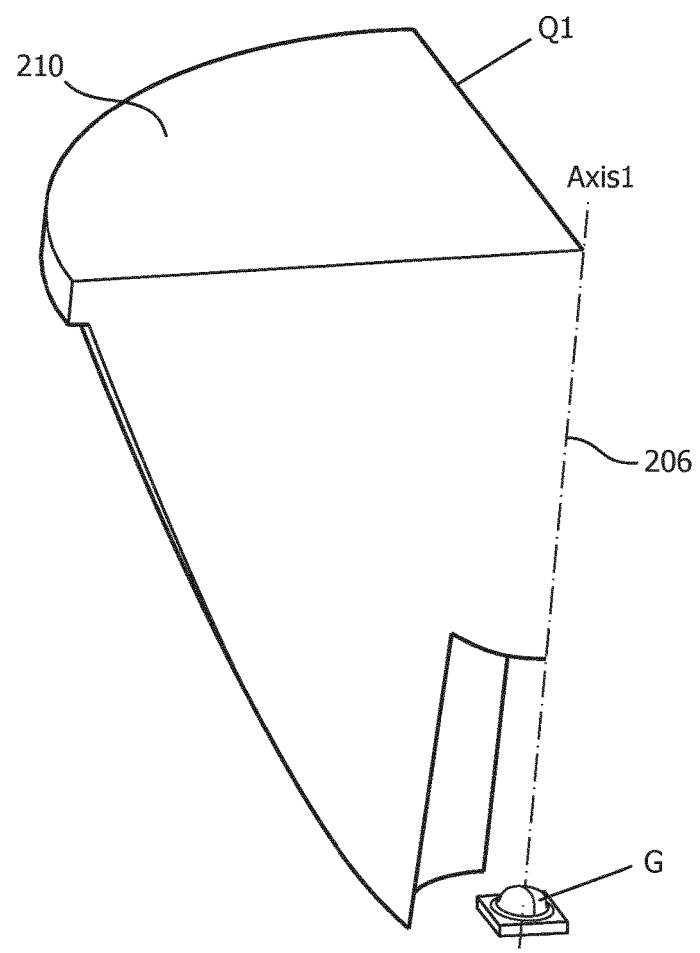
FIG. 4B is a perspective view schematic representation of the result of revolving the profile P 90 degrees around a central optical axis to form Q1 in accordance with an embodiment.

Referring to FIG. 4A, in an additional embodiment, a perspective view schematic representation of a profile ("PF") of Q1 is shown. FIG. 4B shows a perspective view schematic representation of the result of revolving the profile PF 90 degrees around central optical axis 206 to form Q1. As should be appreciated by one of skill in the art, this profile PF and resulting Q1 are created based on the dimensions and the positioning of LED G with respect to Q1 and the directive that the light emitted from LED G totally internally reflects. Stated differently, PF and Q1 are advantageously designed such that light emitted from LED G strikes any part of the surface of Q1 at an angle larger than a particular critical angle with respect to the normal of the surface, and is directed out of the light emitting end 210 of the optic 202 in a direction parallel to the central optical axis 206. Further, the refractive index is lower on the outside of Q1 (which is presumably air with a refractive index of approx. 1.0) as compared with Q1, where Q1 is advantageously made from optic grade plastic polymer (e.g., PMMA (refractive index of approx. 1.5) or polycarbonate (refractive index of approx. 1.6)) to limit impurities. As should be appreciated by a person of skill in the art in conjunction with a review of this disclosure, the fully formed optic 202 (see, e.g., FIG. 3B) is based on several profile sections as follows: a hyperbola conic H1, at least a first line conic L1, and a second line conic L2, and a spline S1 (which is a more complex polynomial function). Each of these sections can be modified at will to achieve different light effect as should be appreciated by those of skill in the art in conjunction with a review of this disclosure.

Figures 5A, 5B:
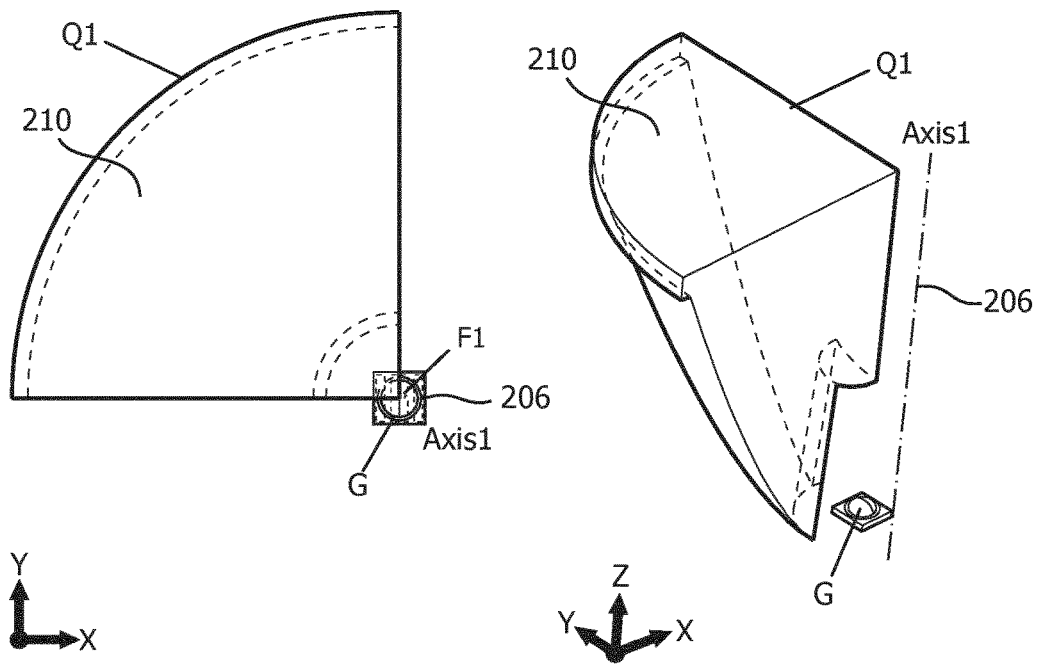
FIG. 5A is a front view schematic representation of the positioning/configuration of Q1 and LED G in accordance with an embodiment.
FIG. 5B is a perspective view schematic representation of the positioning/configuration of Q1 and LED G as shown in FIG. 5A in accordance with an embodiment

Referring to FIGS. 5A-5B, in additional embodiments, a front view schematic representation and a perspective view schematic representation, respectively, of the positioning/configuration of Q1 and LED G are shown. As shown in FIGS. 5A and 5B, Q1 and LED G have been translated to a new focal point F1 running through the center of LED G, and central optical axis 206 is shown offset at the bottom right hand corner of LED G (as compared to the prior art optical system 100, where the central optical axis 106 runs directly through the center of the single LED 104 at coordinates 0, 0, 0 (in the x, y, and z planes respectively)). More specifically, the positioning of focal point F1 is offset from the central optical axis 106 in the negative x-direction, and in the positive y-direction, with no movement in the z-direction. Here, in this example, the specific translation is from 0, 0, 0 to −1.6 mm, 1.6 mm and 0 mm (in the x, y, and z planes respectively). The footprint of LED G in this particular example is 3.5 mm×3.5 mm. It should be understood and appreciated by a person of skill in the art in conjunction with a review of this disclosure that the embodiments described herein should not be limited to the numbers indicated or to the particular light source (i.e., LED), as these numbers and particular light source are set forth for illustrative purposes only. Stated differently, other lights sources and dimensions are contemplated and are still within the scope and spirit of the embodiments described herein (as should be understood and appreciated by a person of skill in the art in conjunction with a review of this disclosure).

Figure 6A:
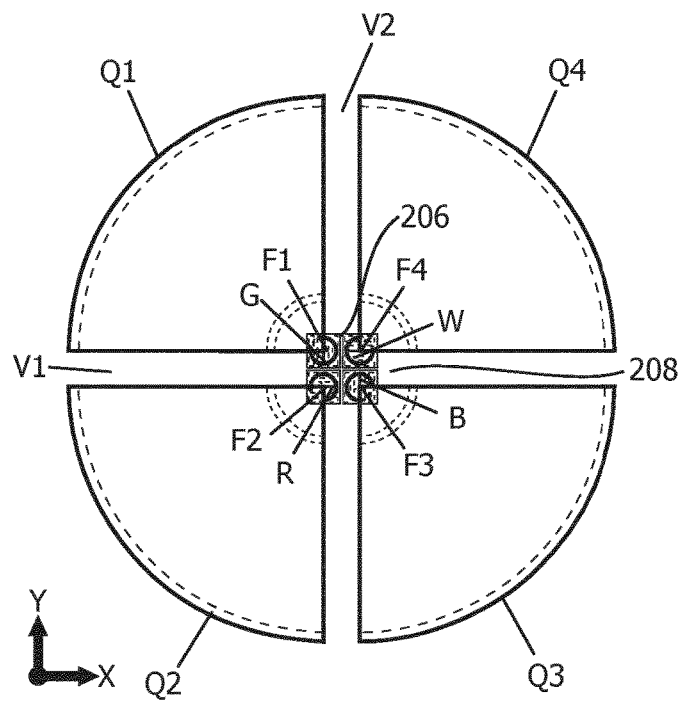
FIG. 6A is a front view schematic representation of the design creation and positioning of Q1, Q2, Q3 and Q4 over respective LEDs G, R, B, and W in accordance with an embodiment.
Figure 6B:
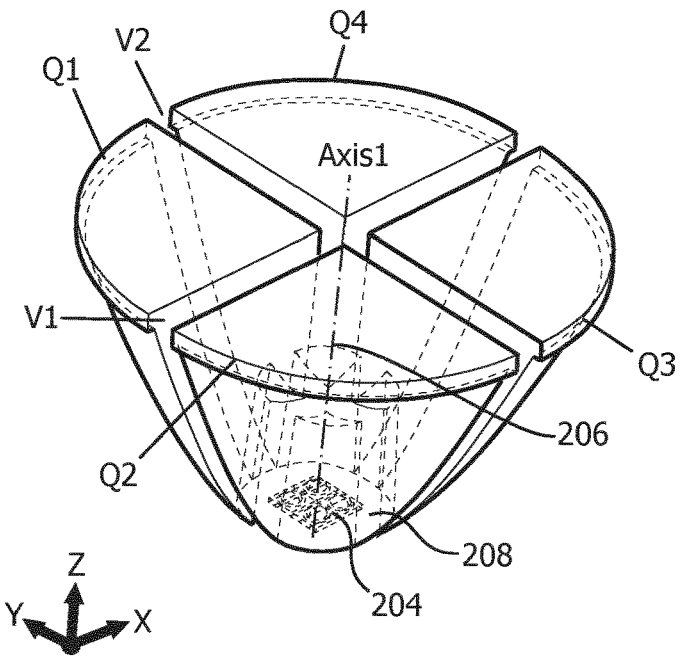
FIG. 6B is a perspective view transparent schematic representation of Q1, Q2, Q3 and Q4 positioned over respective LEDs G, R, B, and W as shown in FIG. 6A in accordance with an embodiment.

Referring to FIG. 6A, in an additional embodiment, a front view schematic representation of the design creation and positioning of Q1, Q2, Q3 and Q4 over respective LEDs G, R, B, and W is shown. FIG. 6B is a perspective view transparent schematic representation of Q1, Q2, Q3 and Q4 positioned over respective LEDs G, R, B, and W, as shown in FIG. 6A. After LED R, LED B and LED W (which are advantageously of the same dimension of LED G) are assembled into place to form node 204 with LED G as shown in FIG. 6A with the central optical axis 206 running through the center of node 204, Q2, Q3 and Q4 are designed and positioned with respect to LEDs R, B, and W by mirroring Q1 through the two vertical planes ("V1" and "V2") to obtain the configuration shown in FIGS. 6A and 6B. More specifically, focal point F2 is directed through the center of LED R, with the central optical axis 206 being offset at the top right hand corner of LED R; focal point F3 is directed through the center of LED B, with the central optical axis 206 being offset at the top left hand corner of LED B; and focal point F4 is directed through the center of LED W, with the central optical axis 206 being offset at the bottom left hand corner of LED W. The positioning of focal point F2 is offset from the central optical axis 106 in the negative x-direction, and in the negative y-direction, with no movement in the z-direction. Here, in this example, the specific coordinates are −1.6 mm, −1.6 mm and 0 mm (in the x, y, and z planes respectively). The positioning of focal point F3 is offset from the central optical axis 206 in the positive x-direction, and in the negative y-direction, with no movement in the z-direction. Here, in this example, the specific coordinates are 1.6 mm, −1.6 mm and 0 mm (in the x, y, and z planes respectively). The positioning of focal point F4 is offset from the central optical axis 106 in the positive x-direction, and in the positive y-direction, with no movement in the z-direction. Here, in this example, the specific coordinates are 1.6 mm, 1.6 mm and 0 mm (in the x, y, and z planes respectively). Practically speaking, there will more than likely be some spacing between each of the LEDs of the node 204. However, it is advantageous to position the four LEDs as close to each other as possible for spacing and manufacturing cost considerations among other considerations.

Figure 7A:
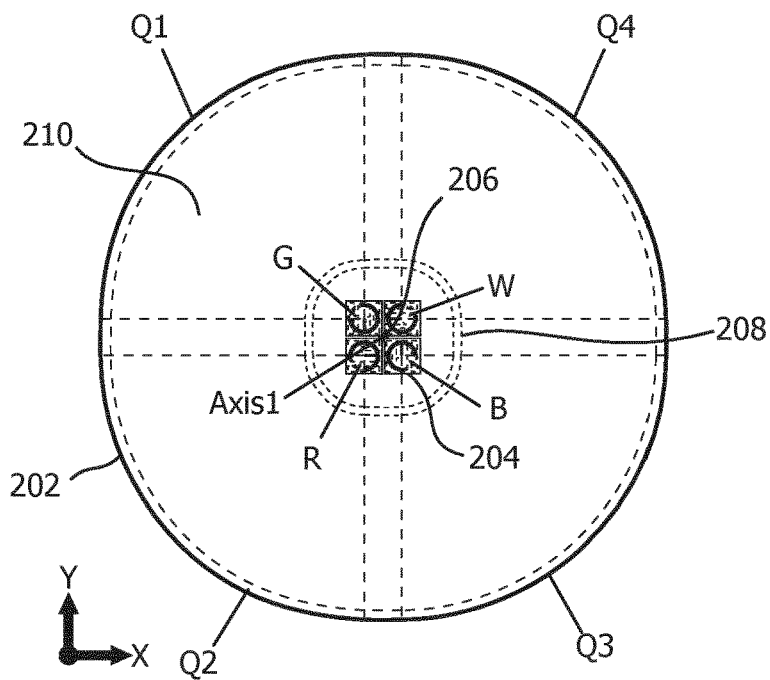
FIG. 7A is a front view transparent schematic representation of the fully formed optical system in accordance with an embodiment.
Figure 7B:
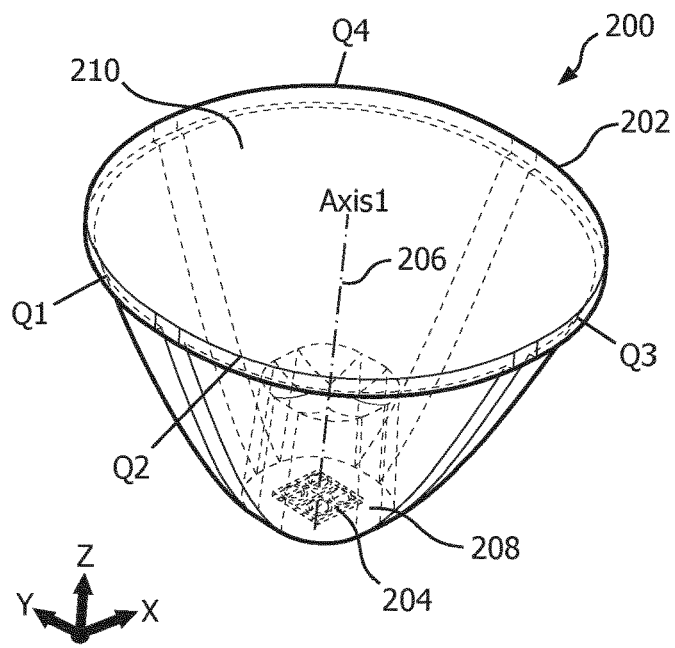
FIG. 7B is a perspective view transparent schematic representation of the fully formed optical system as shown in FIG. 7A in accordance with an embodiment.

Referring to FIG. 7A, in an additional embodiment, a top plan view transparent schematic representation of the fully formed optical system 200 (similar to FIG. 3B) is shown. FIG. 7B is a perspective view transparent schematic representation of the fully formed optical system 200, as shown in FIG. 7A. In particular, FIGS. 7A-7B illustrate the fully formed optical system, in which the optic can be formed by the extrusion of profiles 220 and 222 to connect all four quadrants (Q1, Q2, Q3 and Q4) shown in FIGS. 6A-6B together. In an aspect, the optic 202 can be formed via injection molding and/or extrusion molding of an optical grade plastic polymer, and the LED can be assembled/disposed on the base portion 208 and positioned thereon as described above. It is noted that while the shape of the perimeter of the light-emitting end of the optic in FIG. 7A appears non-circular, the shape will likely be circular but may be non-circular as long as the optic has a TIR profile and satisfies the design criteria for the desired lighting/illumination parameters.

Per this design of the optical system 200, in view of the dimensions and positioning of each the LEDs of node 204 with respect to each the respective quadrants (Q1, Q2, Q3 and Q4) and the directive of total internal reflection (as described above), the fully formed optic 202 can be structured and/or configured to support total internal reflection of light emitting from the LEDs of node 204. Stated differently, fully formed optic 202 can be structured and/or configured to redirect the light emitted by the LEDs of the node 204 through light emitting end 210 into a specific beam of light pattern that is parallel to the central optical axis 206 and is tighter as compared to the prior art optical system 100. Each quadrant (Q1, Q2, Q3 and Q4) of optical system 200 has a focal point for each respective LED of node 204, and the emitted light from each of the LEDs are blended together (as compared to the prior art optical system 100 which has one focal point for the single LED 104). As long as the basics of these design specifications are followed, the size of the LEDs and/or of the optic 202 can be scaled larger or smaller to fit a particular need.

Figure 8A:
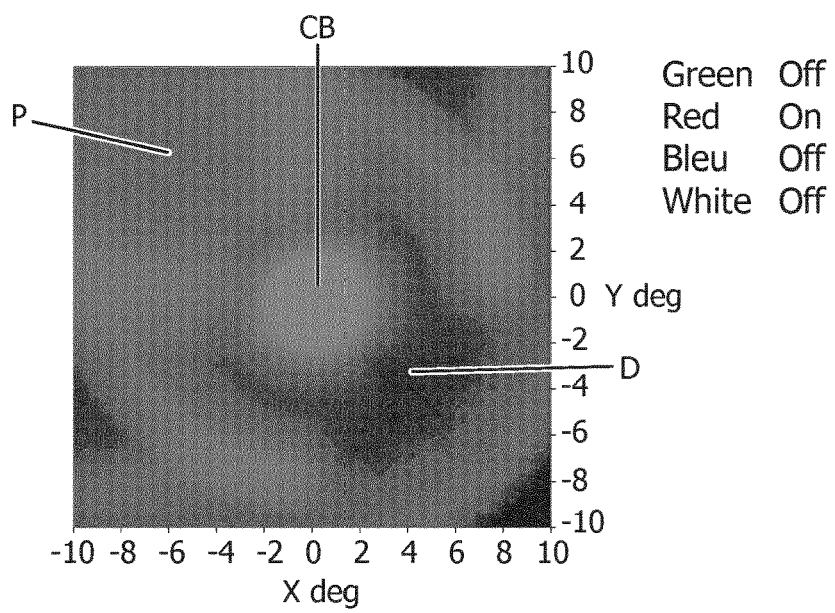
FIG. 8A is a graphical representation of a far field light pattern plot of the optical system shown in FIG. 7A when only LED R is turned on in accordance with an embodiment.
Figure 8B:
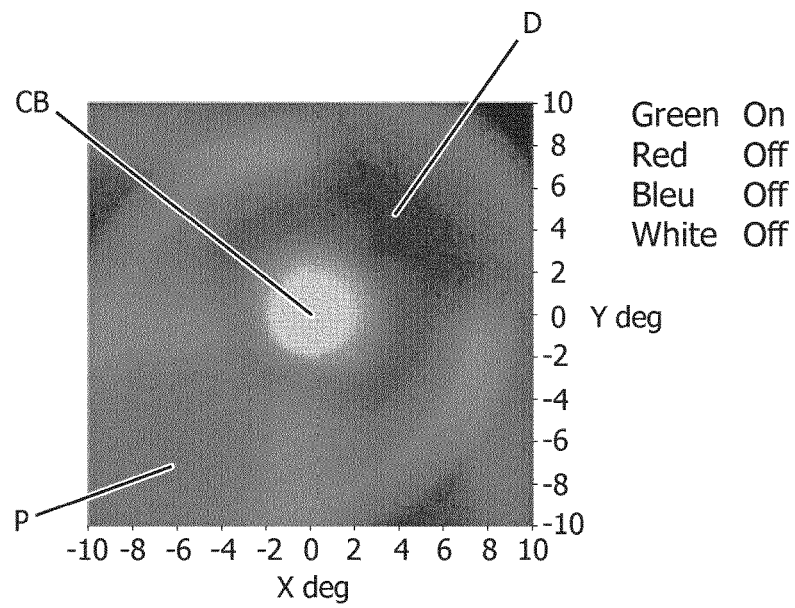
FIG. 8B is a graphical representation of a far field light pattern plot of the optical system shown in FIG. 7A when only LED G is turned on in accordance with an embodiment.
Figure 8C:
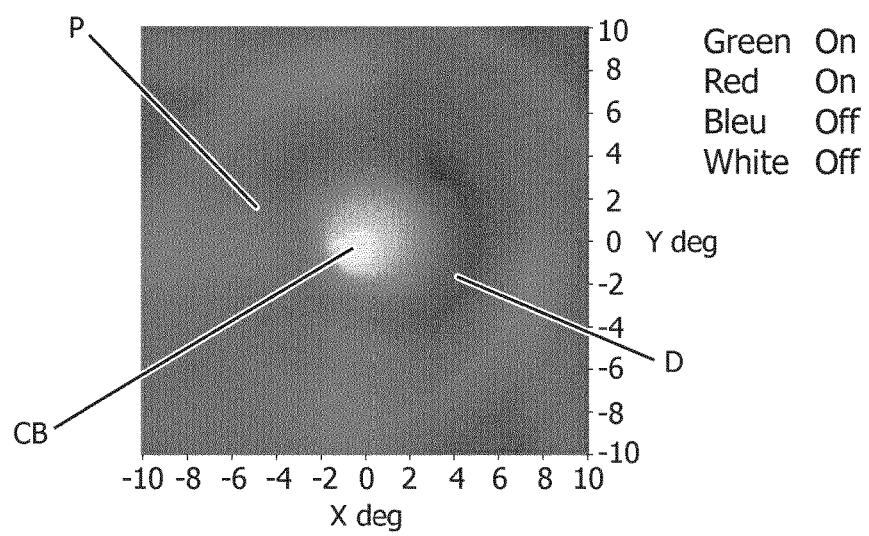
FIG. 8C is a graphical representation of a far field light pattern plot of the optical system shown in FIG. 7A when only LED G and LED R are turned on in accordance with an embodiment.
Figure 8D:
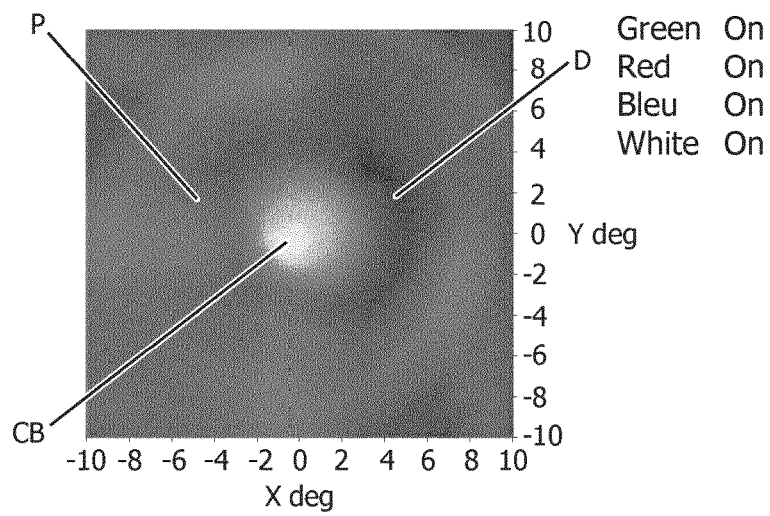
FIG. 8D is a graphical representation of a far field light pattern plot of the optical system shown in FIG. 7A when each of LED G, LED R, LED B, and LED W are turned on in accordance with an embodiment.

Referring to FIGS. 8A-8D, in additional embodiments, far field light pattern plots are shown of the light beam emitted from optical system 200 when certain LEDs are turned on. For example, FIG. 8A shows a far field light pattern plot of optical system 200 when only LED R is turned on; FIG. 8B shows a far field light pattern plot of optical system 200 when only LED G is turned on; FIG. 8C shows a far field light pattern plot of optical system 200 when only LED G and LED R are turned on; and FIG. 8D shows a far field light pattern plot of optical system 200 when each of LED G, LED R, LED B, and LED W are turned on. Each of the far field light pattern plots shows a desirable tight center beam ("CB") (e.g., about 5 degrees in diameter). However, each of the far field light pattern plots also shows scattered/unmixed pollution light ("P") around the center beam CB, and a notable dark spot ("D"). Applicant discovered and appreciates that the pollution light P and dark spots are due to each of the respective LEDs being out of focus with three of the four quadrants of the optical system 200. Notably, the light emitted from the center of each LED overlaps to combine the colors, but the scattered lights do not mix as they do not bend to the same angles. In sum, the results shown by FIGS. 8A-8D illustrate that the optical system 200 achieves a main goal of creating a narrow/tight bright center beam. However, the narrow/tight bright center beam has been created at the expense of scattered light that creates a multitude of undesired unmixed colors.

Figure 9:
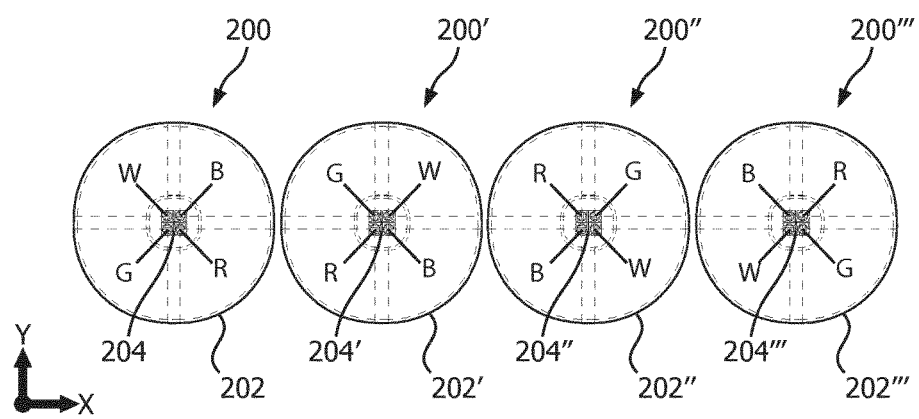
FIG. 9 is a front view transparent schematic representation of a linear/in-line optical layout/array of four adjacent optical systems in accordance with an embodiment.

To address the unmixed scattered pollution light issue, additional embodiments are directed to overlapping the scattered/unmixed pollution light P generated by a plurality of nodes of LEDs in adjacent optical systems so the sum of the emitted light beams is a fully color mixed beam. In the embodiments addressed above, optical system 200 contains a node with four LEDs. Thus, four node groupings are advantageous to achieve sufficient color overlap in view of each of the four LEDs, and each subsequent node is rotated 90 degrees from the prior node (360 degrees/number of LED nodes). Referring to FIG. 9, in an additional embodiment, front view transparent schematic representations of a linear/in-line optical layout/array of four adjacent optical systems 200, 200', 200", and 200' are shown. As illustrated, optical system 200' is rotated clockwise 90 degrees as compared to optical system 200; optical system 200" is rotated clockwise 90 degrees as compared to optical system 200'; and optical system 200' is rotated clockwise 90 degrees as compared to optical system 200".

Figure 10A:
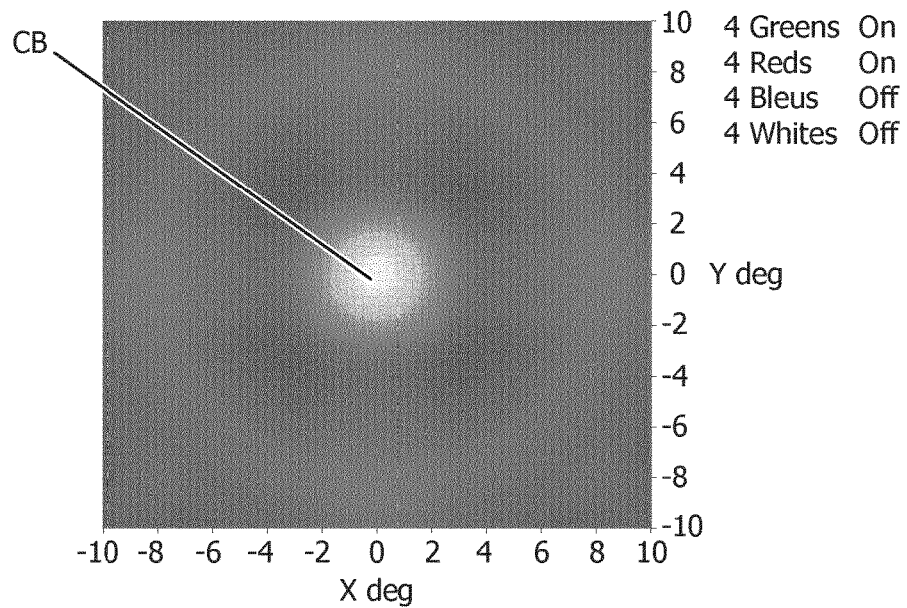
FIG. 10A is a graphical representation of a far field light pattern plot of the optical system array shown in FIG. 9 when only each of the four LED Rs of the optical system array are turned on in accordance with an embodiment.
Figure 10B:
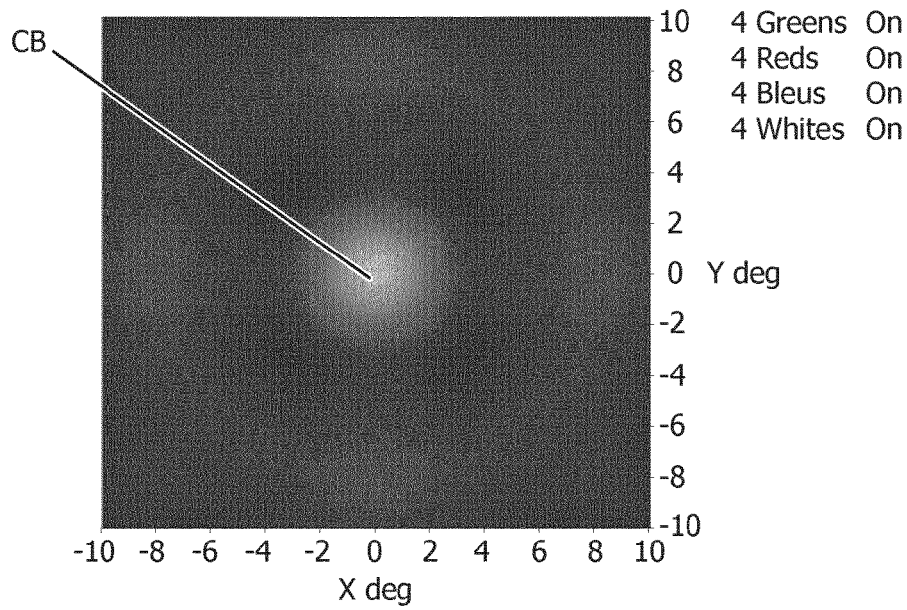
FIG. 10B is a graphical representation of a far field light pattern plot of the optical system array shown in FIG. 9 when all 16 LEDs of the optical system array are turned on in accordance with an embodiment.

Referring to FIGS. 10A and 10B, in additional embodiments, far field light pattern plots are shown of the optical system array of the four adjacent optical systems 200, 200', 200", and 200''' shown in FIG. 9 when certain LEDs are turned on. For example, FIG. 10A shows a far field light pattern plot of the optical system array shown in FIG. 9 when only each of the four LED Rs of the optical system array are turned on; and FIG. 10B shows a far field light pattern plot of the optical system array shown in FIG. 9 when all 16 LEDs of the optical system array are turned on. When comparing FIG. 10A with FIG. 8C and FIG. 10B with FIG. 8D, the results illustrated in FIGS. 10A-10B show a significant improvement in color mixing around the previously established and maintained narrow/tight bright center beam CB (i.e., a clear color mixing perimeter).

The array of four adjacent optical systems 200, 200', 200", and 200''' shown in FIG. 9 is the minimum number of LEDs, nodes, and optics of optical system array embodiment. This number can be scaled up based on the following formula to maintain the advantageous color mixing and narrow/tight bright center beam CB results shown in FIGS. 10A and 10B: N=number of LEDs/node; $x*N^2$=total LEDs; $x*N$=total nodes and therefore optics within which each node is disposed (where "x" is the scaled up number, e.g., "2" if you want to double the size). In FIG. 9, for example N=4, so that you have 16 LEDs ($1*4^2$), 4 nodes (1*4) of 4 LEDs and 4 optics (1*4), where x=1 because FIG. 9 shows the minimum number of LEDs, nodes, and optics of an optical system array embodiment. If one would like to scale up by doubling this result, for example, where N=4, you have 32 LEDs ($2*4^2$), 8 nodes (2*4) of 4 LEDs and 8 optics (2*4).

Figure 11:
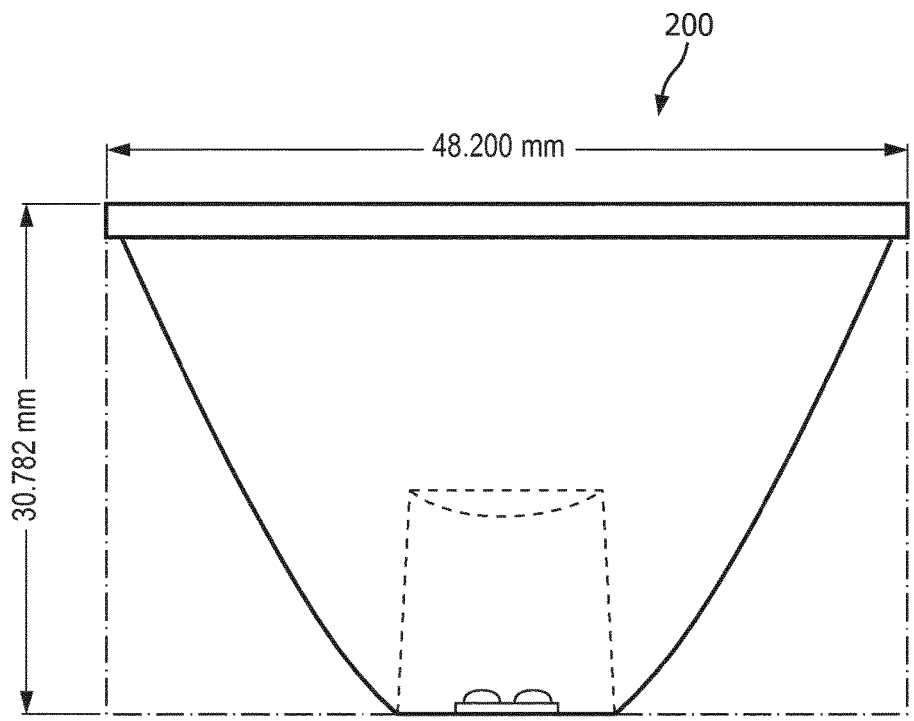
FIG. 11 is a side view transparent schematic representation of an optical system with a single optic and a single node of four LEDs in accordance with an embodiment.

Referring to FIG. 11, in an additional embodiment, a side view transparent schematic representation of a single optical system 200 with a single optic and a single node of four LEDs (as previously described) is shown. More particularly, FIG. 11 shows potential dimensions of such an optical system 200.

Figure 12A:
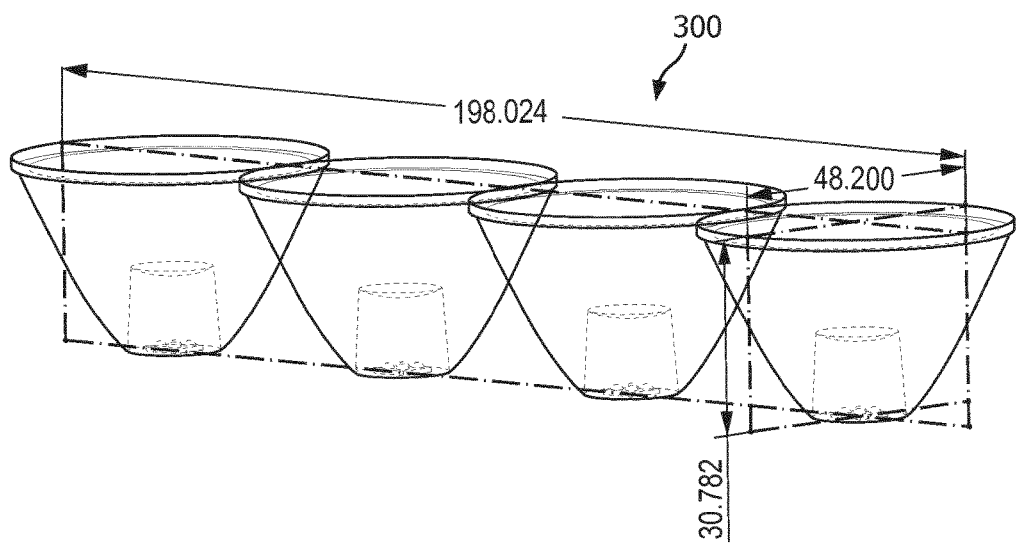
FIG. 12A is a perspective view transparent schematic representation of a linear/in-line optical system layout/array of four adjacent optics each of which includes a node of four LEDs in accordance with an embodiment.

Referring to FIG. 12A, in an additional embodiment, a perspective view transparent schematic representation of a linear/in-line optical layout/array of four adjacent optical systems (with four optics, four nodes, and 16 LEDs—collectively "300") is shown as an advantageous minimum optical system array 300 size. More particularly, FIG. 12A shows potential dimensions of such an optical system array 300.

Figure 12B:
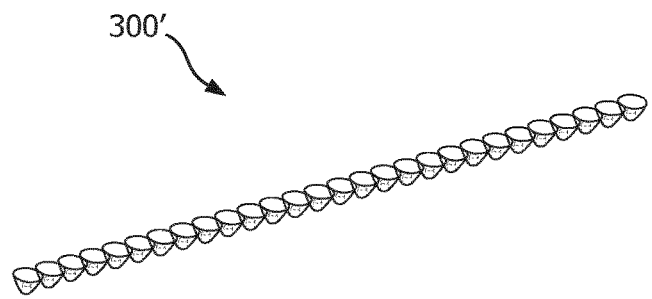
FIG. 12B is a perspective view transparent schematic representation of a 7× scaled up linear/in-line optical layout/array of the optical system array shown in FIG. 12A in accordance with an embodiment.

Referring to FIG. 12B, in an additional embodiment, a perspective view transparent schematic representation of a 7× scaled up linear/in-line optical layout/array 300' of the optical system array shown in FIG. 12A with 28 optics, 28 nodes, and 112 LEDs. The dimensions of such a scaled up optical system array can be 1400 mm×50 mm×31 mm.

Figure 13A:
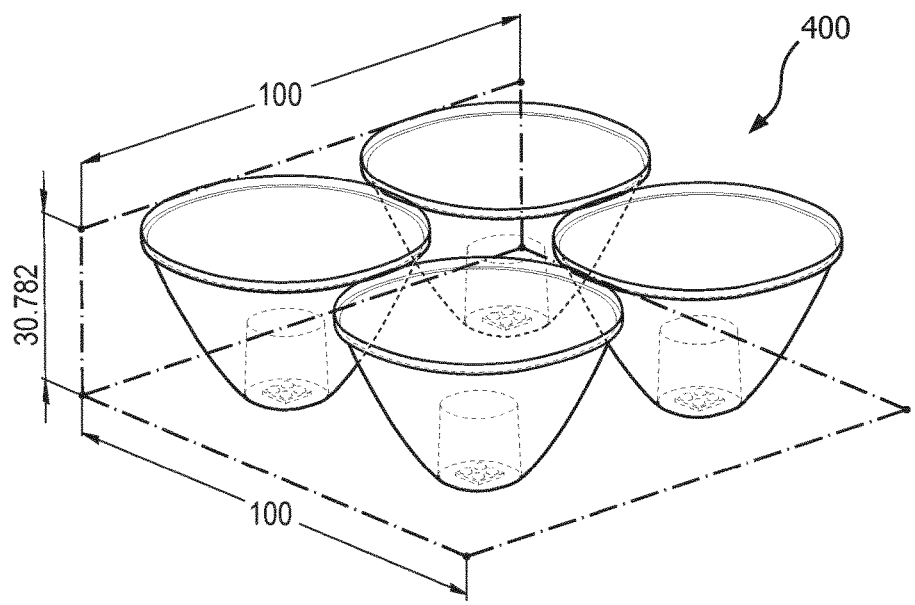
FIG. 13A is a perspective view transparent schematic representation of a rectangular 2×2 optical system array in accordance with an embodiment.
Figure 13B:
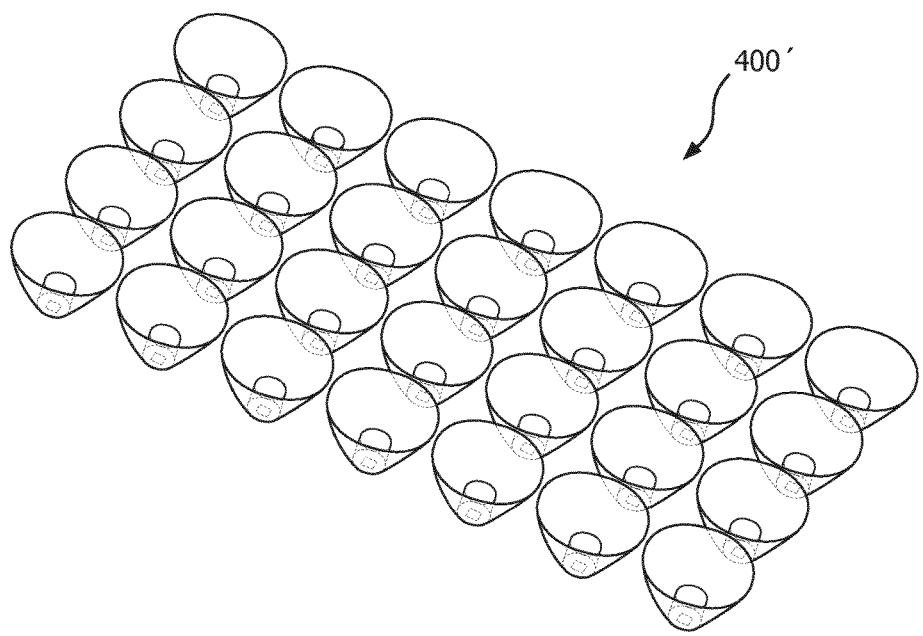
FIG. 13B is a perspective view transparent schematic representation of a 7× scaled up 4×7 optical system array in accordance with an embodiment.

The optical system array (including a plurality of optical systems) of an embodiment does not have to be configured in a linear/in-line optical layout. The optical system array can be configured in a circular, diamond-shaped, 1×3, 2×2, 1×4, 2×8, or any other shape that may be desired, as long as the formula referenced above is followed and each adjacent or subsequent optical system is advantageously turned 90 degrees from the previous optical system in one direction or sequence, e.g., left to right or top to bottom (either consistently clockwise or counterclockwise). For example, FIG. 13A, in another embodiment, shows a perspective view transparent schematic representation of a rectangular 2×2 optical system array 400 and provides potential dimensions of such an optical system array. FIG. 13B shows perspective view transparent schematic representation of a 7× scaled up rectangular 4×7 optical system array 400' with 28 optics, 28 nodes, and 112 LEDs.

The above-referenced disclosure describes an optical system array using four LEDS/nodes, but the embodiments of the present invention are not to be so limited. For example, embodiments of the present invention contemplate a three LED/node optical system array. In brief, the optical system would have three sections instead of four quadrants, each of which including a focal point with which a respective LED would be associated. In an optical system array formed from such an optical system, the foundational optical system array could include—three optics, three nodes, and three LEDs/node=9 total LEDS. Each adjacent node would need to be rotated in one consistent direction (clockwise or counter-clockwise) 120 degrees from the position of a prior adjacent node's position (360 degrees/number of LED nodes) to obtain a preferred color mix.

As should be appreciated by those of skill in the art, texture and/or a substance can be added to the light emitting portion of an optical system to dilute the beam of light and to broaden out the diameter of the beam of light.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An optical system, comprising:
   at least one 2×2 LED array forming a node consisting of four different color LEDs: $LED_1$ (G), $LED_2$ (R), $LED_3$ (B), $LED_4$ (W) and
   at least one respective light-directing housing forming an optic having a base end and a light-emitting end, in which the node is disposed in the base end,
   wherein the optic is characterized by a shape having four different focal points (F1, F2, F3, F4), and by comprising a spline (S1) and a hyperbola conic (H1) as profile sections,
   wherein each of the $LED_1$, $LED_2$, $LED_3$, $LED_4$ is disposed at a respective focal point of both the spline (S1) and the hyperbola conic (H1).

2. The optical system of claim 1, wherein $LED_1$ is a green-emitting LED, $LED_2$ is red-emitting LED, $LED_3$ is a blue-emitting LED, and $LED_4$ is a mint white-emitting LED.

3. The optical system of claim 1, wherein the optic has a TIR profile.

4. The optical system of claim 1, wherein the optic consists of four optical quadrant sections (Q1, Q2, Q3, Q4), wherein each of the four optical quadrant sections is characterized by one of the four focal points.

5. The optical system of claim 1, further comprising a plurality of N nodes and N respective optics, where N is an integer multiple of 4, further wherein each node disposed in its respective optic is rotated by 90 degrees with respect to an immediately adjacent node in its respective optic.

6. The optical system of claim 5, wherein the N nodes and the N respective optics are adjacently disposed in an array, wherein said array is one of an m-by-n array where m and n are integers and m may be equal or not equal to n, and a 1×N array.

7. The optical system of claim 1, wherein the optic is an injected-molded component.

8. The optical system of claim 1, wherein the optic is transparent over the visible spectrum.

9. The optical system of claim 1, wherein each of the $LED_1$, $LED_2$, $LED_3$, $LED_4$ has a variable intensity.

10. The optical system of claim 1, wherein the optic has a textured interior surface.

11. A method of emitting light in a specified beam pattern, comprising:
   providing an optical system comprising:
   at least one 2×2 LED array forming a node consisting of four different color LEDs: $LED_1$ (G), $LED_2$ (K), $LED_3$ (B), $LED_4$ (W); and
   at least one respective TIR light-directing housing forming an optic having a base end and a light-emitting end, in which the node is disposed in the base end,
   wherein the optic is characterized by a shape having four different focal points (F1, F2, F3, F4), and by comprising a spline (S1) and a hyperbola conic (H1) as profile sections,
   wherein each of the $LED_1$, $LED_2$, $LED_3$, $LED_4$ is disposed at a respective focal point of both the spline (S1) and the hyperbola conic (H1);
   energizing the at least one node; and
   illuminating a space adjacent the light-emitting end of the optic.

12. The method of claim 11, further comprising adjusting at least one of an intensity and a color of at least one of the LEDs to provide a desired color output from the optical system.

13. The method of claim 11, further comprising adjusting the TIR profile of the optic to provide the specified emitted beam pattern.

14. The method of claim 11, further comprising providing a plurality of N nodes and N respective optics, where N is an integer multiple of 4, further wherein each node disposed in its respective optic is rotated by 90 degrees with respect to an immediately adjacent node in its respective optic.

15. The method of claim 14, further comprising adjacently disposing the N nodes and the N respective optics in an array, wherein said array is one of an m-by-n array where m and n are integers and m may be equal or not equal to n, and a 1×N array.

* * * * *